(12) United States Patent
Pasotto

(10) Patent No.: US 11,471,801 B2
(45) Date of Patent: Oct. 18, 2022

(54) SPIN-ON FILTER CARTRIDGE WHICH CAN BE EASILY DISASSEMBLED TO ALLOW THE REPLACEMENT OF A FILTER UNIT INCLUDED THEREIN

(71) Applicant: FAI FILTRI S.R.L., Pontirolo Nuovo (IT)

(72) Inventor: Vilmo Pasotto, Pontirolo Nuovo (IT)

(73) Assignee: FAI FILTRI S.R.L., Pontirolo Nuovo (IT)

( * ) Notice: Subject to any disclaimer, the term of this patent is extended or adjusted under 35 U.S.C. 154(b) by 153 days.

(21) Appl. No.: 16/973,616

(22) PCT Filed: Aug. 16, 2018

(86) PCT No.: PCT/IT2018/000109
§ 371 (c)(1),
(2) Date: Dec. 9, 2020

(87) PCT Pub. No.: WO2020/016909
PCT Pub. Date: Jan. 23, 2020

(65) Prior Publication Data
US 2021/0170315 A1   Jun. 10, 2021

(30) Foreign Application Priority Data

Jul. 16, 2018   (IT) .......................... 102018000007237

(51) Int. Cl.
*B01D 35/30*   (2006.01)
*B01D 29/21*   (2006.01)

(52) U.S. Cl.
CPC ............. *B01D 35/30* (2013.01); *B01D 29/21* (2013.01); *B01D 2201/0415* (2013.01); *B01D 2201/295* (2013.01); *B01D 2201/4015* (2013.01)

(58) Field of Classification Search
CPC .................... B01D 35/30; B01D 29/21; B01D 2201/0415; B01D 2201/295; B01D 2201/4015
See application file for complete search history.

(56) References Cited

U.S. PATENT DOCUMENTS 5,548,893 A   8/1996   Koelfgen
2017/0292418 A1   10/2017   Thalmann et al.

FOREIGN PATENT DOCUMENTS

DE   20 2012 104 683   3/2014
WO   2013/107572   7/2013
(Continued)

OTHER PUBLICATIONS

International Search Report for PCT/IT2018/000109 dated Mar. 15, 2019, 4 pages.
(Continued)

*Primary Examiner* — Waqaas Ali
(74) *Attorney, Agent, or Firm* — Nixon & Vanderhye

(57) ABSTRACT

A spin-on filter cartridge includes a flange with peripheral holes for entrance, and a middle hole for exit. The cartridge includes a container with a cylindrical side wall having a base at a first end, and an opening at a second end. The flange reversibly occludes the opening. The container reversibly connects to the flange by a bayonet. The cartridge includes a filter unit including a cylindrical side wall having a base at a first end, and an opening at a second end. The bases oppose each other, the filter unit opening opposing the flange. The filter unit rotates integrally with the container. A spring between the bases pushes the filter unit towards the flange, the filter unit dividing the space into a first compartment, outside the filter unit, accessible by peripheral holes of the flange, and a second compartment, inside the filter unit, accessible by the middle hole.

10 Claims, 10 Drawing Sheets

(56) References Cited

FOREIGN PATENT DOCUMENTS

| | | |
|---|---|---|
| WO | 2014/184637 | 11/2014 |
| WO | 2016/162744 | 10/2016 |
| WO | WO-2016162744 A1 * | 10/2016 |

OTHER PUBLICATIONS

Written Opinion of the ISA for PCT/IT2018/000109 dated Mar. 15, 2019, 10 pages.

\* cited by examiner

SPIN-ON FILTER CARTRIDGE WHICH CAN BE EASILY DISASSEMBLED TO ALLOW THE REPLACEMENT OF A FILTER UNIT INCLUDED THEREIN

CROSS-REFERENCE TO RELATED APPLICATIONS

This application is the U.S. national phase of International Application No. PCT/IT2018/000109 filed Aug. 16, 2018 which designated the U.S. and claims priority to IT 102018000007237 filed Jul. 16, 2018, the entire contents of each of which are hereby incorporated by reference.

FIELD OF APPLICATION OF THE INVENTION

The present invention is applied in the technical field concerning filter cartridges which are reversibly screwable to a fluid-dynamic system (such as for example, an oleodynamic, hydraulic or motor system) for the decontamination of one or more fluids circulating therein. The fluids subjected to filtration may consist, by way of example, of hydraulic oil, lubrication oil, combustible fluids, glycol water, emulsions and synthetic fluids. Incidentally, the adverb "reversibly" means that the filter cartridges are screwable to a fluid-dynamic system and unscrewable therefrom an indefinite number of times. Filter cartridges of this type are defined "spin-on".

The present invention in particular relates to a spin-on filter cartridge which can be easily disassembled to allow the replacement of a filter unit included therein.

OVERVIEW OF THE PRIOR ART

Known spin-on filter cartridges generally comprise a tubular filter element accommodated in a cylindrical container, which is almost closed at one end by a substantially discoidal flange.

The flange, which preferably is made of aluminum or steel, is the component of the cartridge at which the latter may be screwed to a fluid-dynamic system. Namely, the flange comprises a circular-shaped middle hole from which a tubular shank departs, extending inside the cartridge. The shank is threaded internally and is screwable to a nipple (of a fluid-dynamic system) threaded externally at a cylindrical coupling surface. The flange further comprises a plurality of peripheral holes arranged circumferentially about a middle hole. The fluid to be filtered enters the cartridge through the peripheral holes and after being filtered by the filter unit, leaves the cartridge through the middle hole. The container usually is made of drawn sheet and is connected to the flange at a circular edge thereof.

The filter unit comprises a tubular core made of steel or plastic material closed at one end by a base and including a plurality of through holes at the side wall thereof. The tubular core is laterally and externally coated by a pleated cylindrical element obtained by folding a composite filter septum, having a single layer or multi layers, on itself, including cellulose fibers, inorganic microfibers and/or plastic or metal meshes. Said pleated element is supported by the tubular core and is the filter component "in the strict sense". The pleated element and the tubular core are fitted on each other so as to be coaxial.

The filter unit is accommodated in the container so that the mouth of the tubular core is partially fitted on the shank of the flange with the interposition of an annular seal, such as e.g. an O-ring. A spring presses the filter unit against the flange so as to ensure a sealing coupling between the two by means of the aforesaid seal. Due to this, the filter unit divides the volume inside the container into two compartments: a first compartment, outside the filter unit, which communicates with the aforesaid peripheral holes of the flange, and a second compartment, inside the filter unit, which communicates with the aforesaid middle hole. A further annular seal is tightened between the container and the flange, and a third annular seal is accommodated on the flange, externally to the latter in order to ensure a sealing coupling between the flange and the nipple to which the cartridge is screwed. If the container and the flange are made of relatively thin sheet, the seal therebetween may be obtained by means of a stapling including sealing material, rather than being obtained by means of the interposition of an annular seal.

During the operation of the system to which the cartridge is connected, the fluid to be filtered enters the latter through the peripheral holes of the flange and occupies the aforesaid first compartment. Due to a pressure difference between the inside and the outside of the filter unit, the fluid tends to cross the side wall of the latter, thus being decontaminated and accumulating in the second compartment. From here, the fluid returns into the system, leaving the cartridge through the middle hole of the flange.

The filter unit retains an increasingly greater quantity of contaminating substances during use. Thus, it tends to get clogged due to the progressive accumulation of substances retained. Disadvantageously, the connection between the container and the flange in known spin-on filter cartridges is of the irreversible type. Due to this, when the filter unit is clogged (so as to no longer be capable of adequately performing its filter action), the whole cartridge is to be replaced.

OBJECTS OF THE INVENTION

It is the object of the present invention to overcome the aforesaid drawbacks by providing a spin-on filter cartridge which can be easily disassembled so as to allow the replacement of the filter unit included therein, when required.

SUMMARY AND ADVANTAGES OF THE INVENTION

The present invention relates to a spin-on filter cartridge comprising:
 a substantially discoidal flange at which the cartridge may be reversibly screwed to a fluid-dynamic system (namely as mentioned above, the cartridge may be screwed to a fluid-dynamic system and unscrewed from the latter an indefinite number of times), said flange comprising:
  at least a first through hole to allow a fluid to be filtered to enter into the cartridge;
  at least a second through hole to allow said fluid to exit from the cartridge after being filtered;
 a container comprising:
  at least one substantially cylindrical side wall;
  a base connected to said side wall at a first end thereof;
  an opening at a second end of said side wall, opposite to said first end, said opening being reversibly occluded by said flange (namely, the latter may be inserted into the container so as to occlude said opening, and may be extracted from the latter an indefinite number of times);
 reversible connection means between said flange and said container (namely, the flange and the container are connectable to each other and disconnectable from each other an indefinite number of times);
first sealing means between said flange and said container;
a filter unit comprising:
  at least one substantially cylindrical side wall;
  a base connected to said side wall of the filter unit at a first end thereof;
  an opening at a second end of said side wall, opposite to said first end, said filter unit being reversibly accommodated in said container (namely, it may be inserted into the container and may be extracted from the latter an indefinite number of times) so that:
    said bases (of the container and of the filter unit) are opposed to each other,
    and
    said opening of the filter unit is opposed to said flange;
elastic means accommodated in said container and compressed between said bases so as to push said filter unit towards said flange, said filter unit dividing the space inside said container into:
  a first compartment, outside said filter unit, which is accessible by means of said first hole;
  a second compartment, inside said filter unit, which is accessible by means of said second hole and said opening of the filter unit;
second sealing means between said flange and said filter unit so that the passage of a fluid between said first and second compartments may only take place with a crossing of said filter unit,
In which, according to the invention, the connection means comprise:
  at least one protrusion radially projecting from said flange;
  at least a first recess extending longitudinally (namely, axially) and at least inside said side wall of the container, from said opening thereof, said first recess having a sufficient circumferential extension so that said protrusion may be accommodated in said first recess when said flange occludes said opening of the container;
  at least a second recess extending circumferentially and at least inside said side wall of the container close to said opening thereof, from said first recess, said protrusion and said second recess substantially having the same longitudinal extension so that:
    when it is accommodated in said first recess, said protrusion may be at least partially accommodated in said second recess by means of a relative rotation between said flange and said container about a longitudinal axis thereof,
    and
    an at least partial housing of said protrusion in said second recess translationally restrains said flange and said container to each other;
  stopping means adapted to create a reversible rotational restraint about said longitudinal axis between said flange and said container when said protrusion is accommodated in said second recess in a given position which is indicated later in the present description with the term "closed" position,
so that said reversible connection between said flange and said container is of the bayonet type.
Incidentally, the term "reversible restraint" means that said flange and said container may be restrained to each other and released from each other an indefinite number of times.

Given that the container is reversibly connected to the flange, the filter cartridge of the invention may be defined as "disassemblable". In particular, by using the cartridge of the invention, when the filter unit is no longer capable of adequately performing its retaining action, rather than replacing the whole cartridge, it is sufficient to disassemble the latter by disconnecting the container from the flange and then replacing the filter unit and reconnecting the container to the flange. With respect to known filter cartridges (which are so-called "disposable" devices), the cartridge of the invention is thus highly advantageous both in economic terms and in terms of environmental impact.

In addition to the above, given that the cartridge of the invention is disassemblable, it may also be disassembled for the sole purpose of inspecting the inside of the container. If performed on a known filter cartridge, a similar operation would make the latter no longer usable. The cartridge of the invention may instead be easily reassembled and used again.

In order to connect the container to the flange (in order to assemble the cartridge):
  a) insert the flange at the opening of the container so that the protrusion of the flange is accommodated in the first recess;
  b) rotate the container with respect to the flange so as to cause the protrusion to slide inside the second recess up to reaching the position at which the stopping means intervene, so as to integrally connect the container to the flange.

Similarly, in order to disconnect the container from the flange (in order to disassemble the cartridge):
  a) rotate the container with respect to the flange so as to overcome the opposition of the stopping means and in sufficient measure to cause the protrusion to come out of the second recess, thus accommodating it in the first recess;
  b) extract the flange from the container (and with it, the protrusion from the first recess).

The above-described reversible connection method makes the cartridge of the invention disassemblable and reassemblable in a highly easy manner. In addition to this, the connection and the disconnection between the container and the flange occur by causing the container to rotate in one direction or in the opposite direction, respectively, with respect to the flange (and therefore, with respect to the fluid-dynamic system to which the flange is connected). Said operations advantageously are natural for an operator in the field since, from the viewpoint of the latter, they coincide with the screwing and unscrewing operations of the filter cartridge to/from the fluid-dynamic system. Other innovative features of the present invention are shown in the following description and are referred to in the dependent claims.

According to one aspect of the invention, said first recess has such a longitudinal extension that when said flange occludes said opening of the container, said protrusion may be placed abutting against a lower edge of said first recess, said second recess extending circumferentially from said lower edge.

According to another aspect of the invention, said first recess has a circumferential extension which is substantially equal to that of said protrusion. Advantageously, the protrusion of the flange and the first recess of the container substantially act as guiding means for fitting the container on the flange. Thereby, the assembly of the cartridge is even easier. To connect the container to the flange, indeed one is simply fitted on the other by inserting the protrusion into the first recess up to sending it to abut against the lower edge of the latter, and then causing the container to rotate with respect to the flange so as to cause the protrusion to slide inside the second recess up to the aforesaid closed position (at which the stopping means intervene).

According to another aspect of the invention, said elastic means are longitudinally compressed (namely, axially) so that said filter unit is pushed towards said flange by a longitudinally directed force (exerted by said elastic means),
the cartridge comprising:
  guiding means of said filter unit with respect to said container, said guiding means being suitable for:
    allowing a longitudinal translation
    and
    creating a rotational restraint about said longitudinal axis between said filter unit and said container;
  said stopping means comprising:
    at least one stop integrally connected to said flange or to said container, said stop being positioned so that said container or said flange abuts against said stop, which is connected to said flange or to said container respectively, when said protrusion reaches said closed position during a penetration thereof in said second recess due to a relative rotation between said flange and said container about said longitudinal axis;
    at least a first tooth projecting longitudinally (namely, axially) from said side wall of the filter unit towards said flange;
    at least a second tooth projecting longitudinally (namely, axially) from said flange towards said filter unit,
      said first and second teeth being positioned so as to be in contact with each other when said protrusion is in said closed position so as to counter said protrusion from moving away from said closed position in a direction leaving said second recess,
      said first and second teeth being shaped so that when they are in contact with each other, a relative rotation between said flange and said container about said longitudinal axis tends to cause the filter unit to translate with respect to the container.

As is shown in greater detail later in the present description, when the filter unit is accommodated in the container and the opening of the latter is occluded by the flange (namely, when the cartridge is assembled):
  given that the filter unit is rotationally integral with the container (due to the presence of the guiding means);
  given that the filter unit is pushed towards the flange by a longitudinally directed force exerted by the elastic means; and
  given that the first and the second tooth are directed longitudinally,
the container is to be grasped and a torque tending to cause the latter to rotate in such a direction that the protrusion tends to leave the second recess, is to be exerted to overcome the opposition of the stopping means when there is the need to disassemble the cartridge. The torque is to be sufficiently intense so as to overcome the friction between the two teeth and the elastic force of the spring.

Similarly, where there is the need to reassemble the cartridge, the opposition of the stopping means is to be overcome to bring the container or the flange to abut against the aforesaid stop.

According to another aspect of the invention, said container is reversibly and at least partially fitted on said flange, said first sealing means comprising at least one radially compressed annular seal between said container and said flange.

Advantageously, according to this aspect of the invention, the seat of the first sealing means is protected from knocks which could take place between the components of the cartridge during the assembly thereof. In addition to this, a radial seal contributes to keeping the flange, the filter unit and the container coaxial.

According to another aspect of the invention which is an alternative to the preceding one, said first sealing means comprise at least one longitudinally compressed annular seal (namely, axially) between said container and said flange.

Advantageously, according to this aspect of the invention, the seal is not subject to any sliding if blanketing phenomena between the container and the flange take place during the use of the cartridge, namely slight and repeated oscillations of the container in longitudinal direction with respect to the flange due to the circulation of the fluid in the cartridge.

In addition to this, the mechanical processing to be performed on the container in order to make the seat for accommodating the annular seal is simpler with respect to the version of the cartridge with the radially compressed first sealing means.

The invention also relates to a substantially discoidal flange for a spin-on filter cartridge at which said cartridge may be reversibly screwed to a fluid-dynamic system,
  said flange comprising:
    at least a first through hole to allow a fluid to be filtered to enter into the cartridge;
    at least a second through hole to allow said fluid to exit from the cartridge after being filtered, in which, according to the invention, said flange comprises:
    at least one protrusion radially projecting from a side wall thereof;
    at least one tooth projecting longitudinally (namely, axially) from a base thereof.

The invention also relates to a container in which a filter unit of a spin-on filter cartridge may be accommodated,
  said container comprising:
    at least one substantially cylindrical side wall;
    a base connected to said side wall at a first end thereof;
    an opening at a second end of said side wall, opposite to said first end, said opening being occludable by a flange of said cartridge; in which, according to the invention, said container comprises:
    at least a first recess extending longitudinally and at least inside said side wall, from said opening;
    at least a second recess extending circumferentially and at least inside said side wall close to said opening, from said first recess;
    at least one groove extending longitudinally and inside said side wall, from said opening.

The invention also relates to a filter unit which may be accommodated in a spin-on filter cartridge,
  said filter unit comprising:
    at least one substantially cylindrical side wall;
    a base connected to said side wall at a first end thereof;
    an opening at a second end of said side wall, opposite to said first end, said filter unit being connectable to a flange of said cartridge at said opening,
  in which, according to the invention, said filter unit comprises:
    at least one tooth projecting longitudinally (namely, axially) and outside said side wall at said opening;
    at least a further tooth projecting radially and outside said side wall.

BRIEF DESCRIPTION OF THE DRAWINGS

Further objects and advantages of the present invention will become apparent from the detailed description provided below of exemplary embodiments thereof and from the accompanying drawings merely given by way of a non-limiting example, in which.

DETAILED DESCRIPTION OF SOME PREFERRED EMBODIMENTS OF THE INVENTION

In the continuation of the present description, a figure may also be shown with reference to elements not expressly indicated in that figure but in other figures. The scale and proportions of the different elements depicted do not necessarily correspond to the actual ones.

Figure 1:
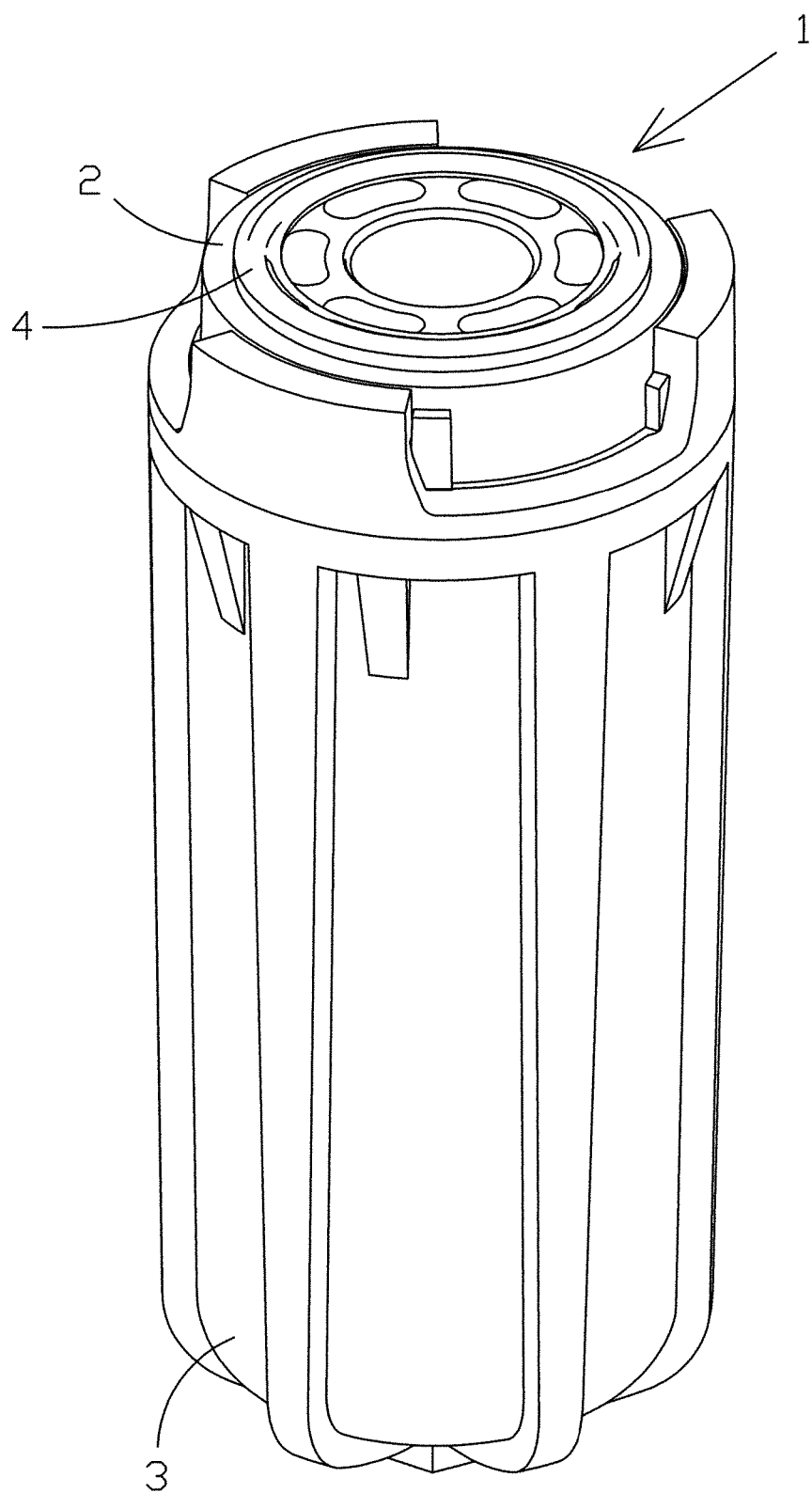
FIG. 1 shows a perspective view of a spin-on filter cartridge according to the present invention.

FIG. 1 shows a filter cartridge 1, of the invention, comprising a flange 2 partially accommodated in a container 3.

Figure 2:
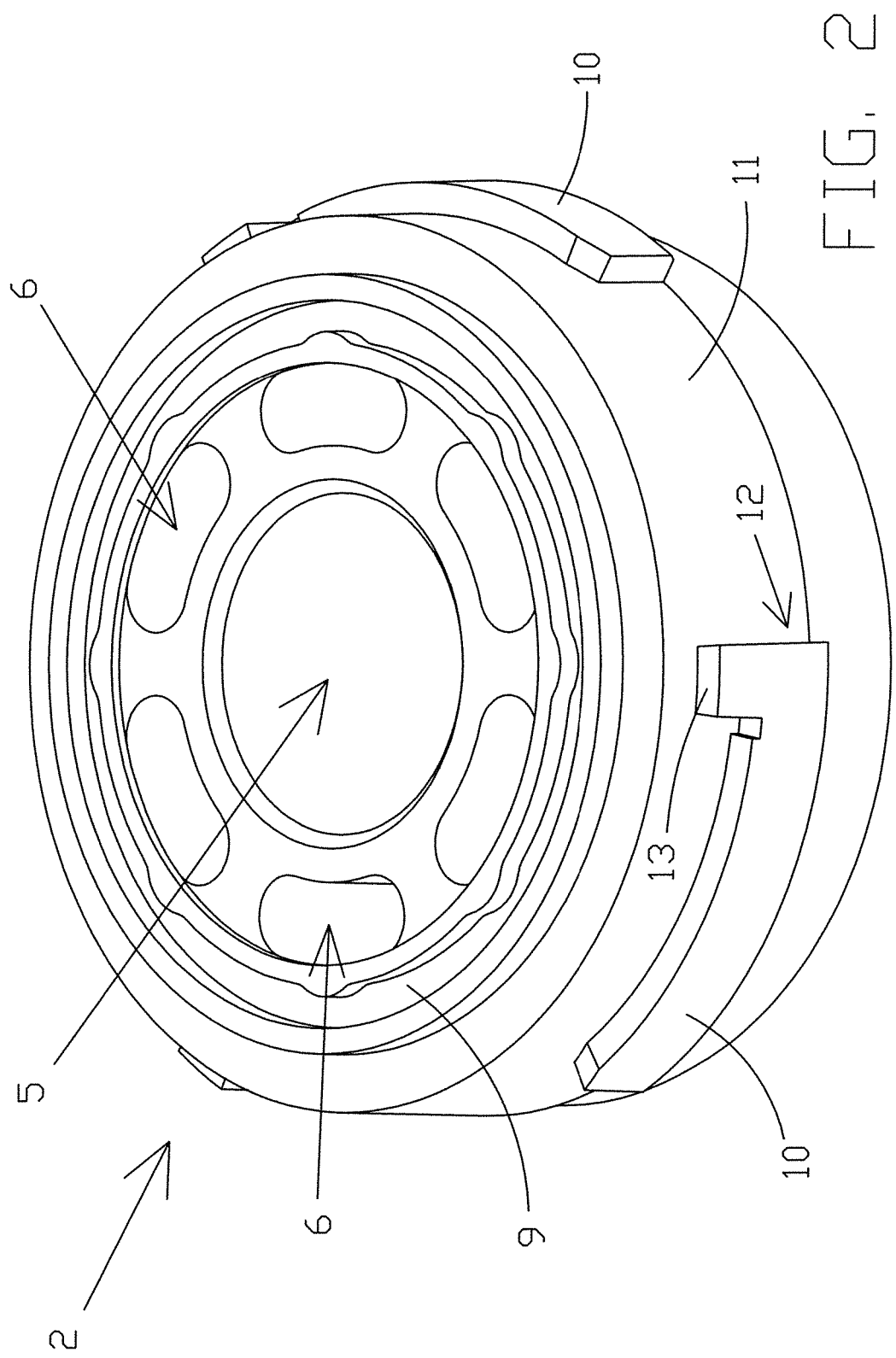
FIG. 2 shows a top perspective view of a first component of the cartridge in FIG. 1. Namely, said first component is a flange.
Figure 3:
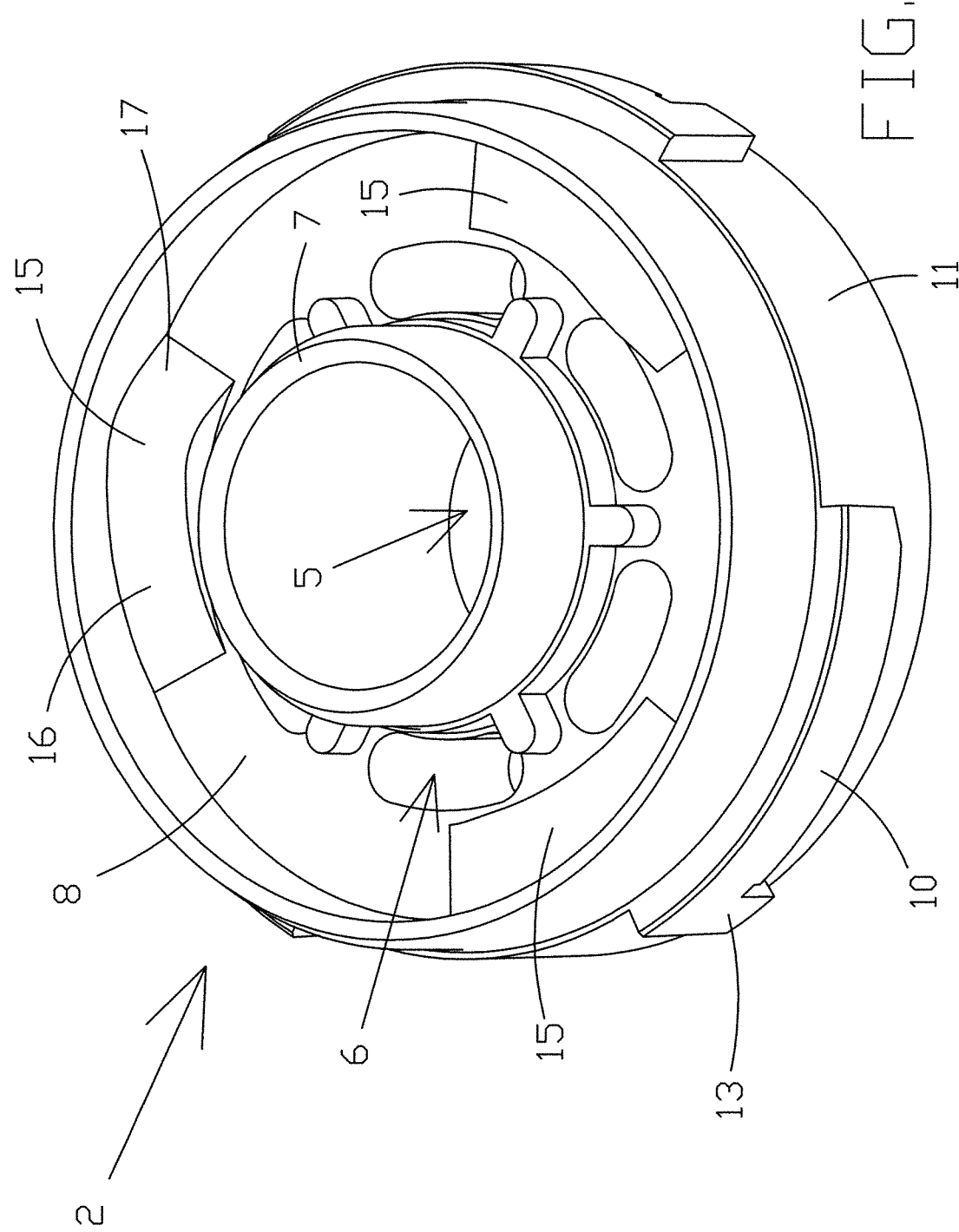
FIG. 3 shows a bottom perspective view of the flange in FIG. 2.

With reference to FIGS. 2 and 3, it may be noted that flange 2, again of the invention, is substantially discoidal-shaped. Flange 2 comprises a preferably circular middle through hole 5 and a plurality of peripheral holes 6, they also through holes, preferably arranged circumferentially about hole 5. The holes 6 (six shown by way of example) preferably are elongated in shape, circumferentially equally spaced from one another and equal to one another.

Hole 5 is delimited by a substantially tubular shank 7 which extends towards the inside of container 3, from a base 8 of flange 2 which can be identified as "lower base" (with reference to the orientation of flange 2 shown in FIGS. 1 and 2). Shank 7 is threaded internally so as to allow flange 2 to be screwed to an externally threaded cylindrical surface of a nipple of a fluid-dynamic system.

Flange 2 is thus the component of cartridge 1 by means of which the latter is reversibly connectable (by means of screwing) to a fluid-dynamic system for filtering a fluid circulating in said system. Namely, the holes 6 (corresponding to the aforementioned "first hole") allow the fluid to be filtered to enter into cartridge 1. Hole 5 (corresponding to the aforementioned "second hole") allows the filtered fluid to exit from cartridge 1. Incidentally, although six holes 6 are shown by way of example, it is sufficient for the cartridge to comprise one hole 6 to allow the fluid to be filtered to enter into cartridge 1.

Incidentally, given that cartridge 1 may be reversibly screwed to a fluid-dynamic system, it is of the spin-on type.

The seal between cartridge 1 and the fluid-dynamic system is ensured by an annular seal 4 (shown in FIG. 1) accommodated at a seat 9, it also annular, made at the base of flange 2, which is arranged at the top in FIGS. 1 and 2 (namely, opposite to base 8). Seat 9 preferably is concentric to hole 5 and is external with respect to the holes 6. Seal 4 is preferably an O-ring and is frontally compressed (namely, axially in orthogonal direction to base 8) when cartridge 1 is screwed to a nipple of a fluid-dynamic system. Rather than being an O-ring, seal 4 could have a rectangular or other-shaped cross section. The sealing coupling between a spin-on filter cartridge and the nipple of a fluid-dynamic system is known. Therefore, further details will not be provided.

As it may be noted in FIGS. 2 and 3, multiple protrusions 10 (three shown by way of example) radially project from a side wall 11 of flange 2. The protrusions 10 preferably are elongated in shape, circumferentially equally spaced from one another and equal to one another. More preferably, each protrusion 10 extends circumferentially on wall 11 with a thickness in almost constant radial direction.

The height of each protrusion 10 in longitudinal direction is also almost constant, with the exception of an end stretch 12 (on the right-hand side in FIG. 2) of protrusion 10 characterized by an increased height. Namely, each protrusion 10 at stretch 12 is overhung by a block 13 which extends longitudinally away from base 8. Each protrusion 10 is almost "L"-shaped rotated to the left by 90°, due to the presence of block 13. Incidentally, given that there are three protrusions 10 by way of example, they are rotated with respect to one another by 120° with respect to a longitudinal axis of flange 2 (orthogonal to base 8). The protrusions 10 preferably lie at the same distance from base 8 and, as is shown later in the present description, play a fundamental role in obtaining a reversible bayonet connection between container 3 and flange 2. Incidentally, although three protrusions 10 are shown by way of example, it is sufficient for the flange to comprise one protrusion 10 to allow a reversible bayonet connection between container 3 and flange 2.

Figure 4:
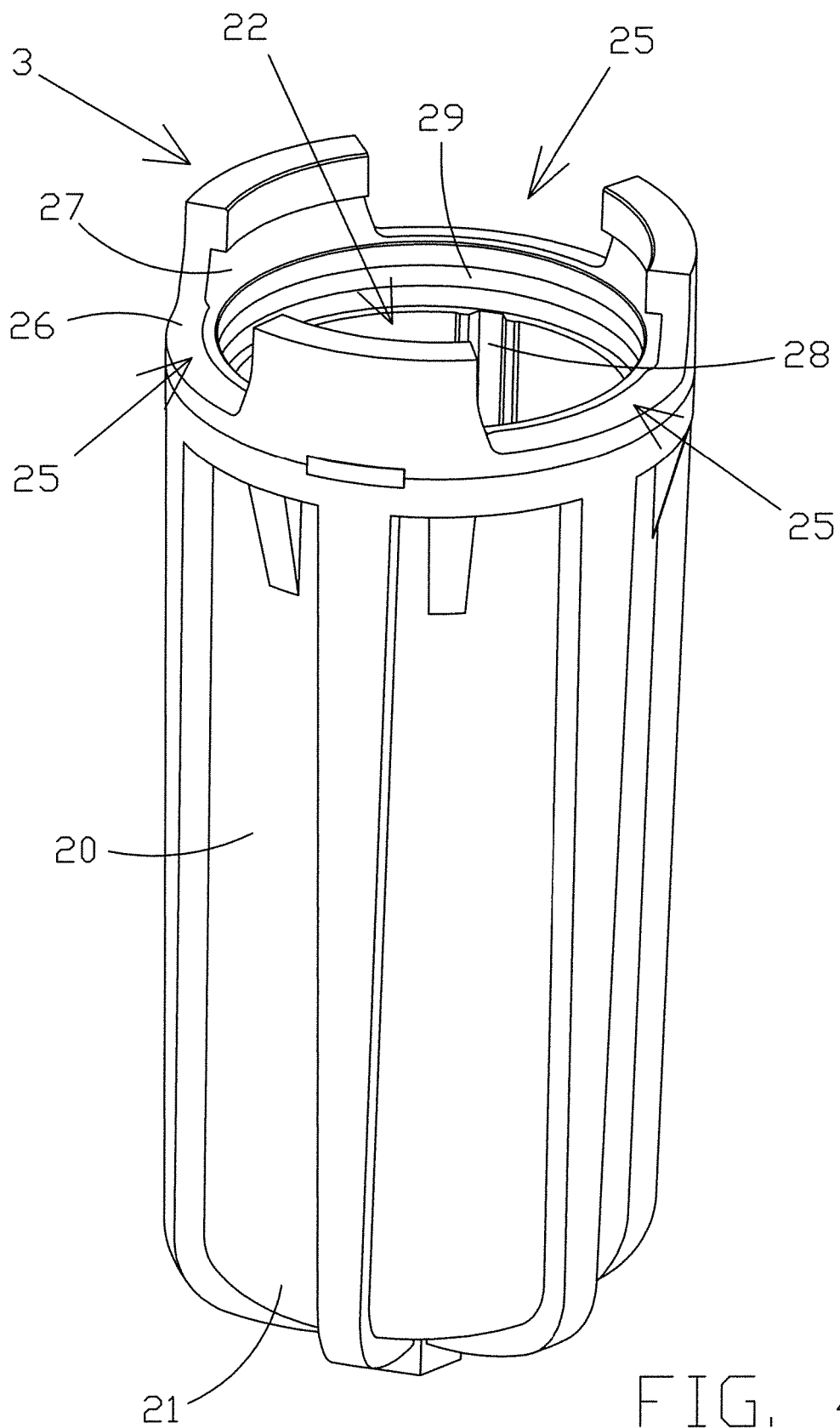
FIG. 4 shows a front perspective view of a second component of the cartridge in FIG. 1. Namely, said second component is a container which may be occluded by the flange in FIG. 2.

With reference to FIG. 3, it may be noted that multiple teeth 15 (three shown by way of example) project longitudinally from the base 8 of flange 2. The teeth 15 (corresponding to the aforementioned "second tooth") preferably are elongated in shape, circumferentially equally spaced from one another and equal to one another. More preferably, each tooth 15 extends circumferentially on base 8 with a width in almost constant radial direction. The height in longitudinal direction instead preferably is such as to give each tooth 15 the shape of a wedge. Namely, each tooth 15 comprises a first ramp 16 and a second ramp 17, which converge towards each other from base 8. With respect to the latter (namely, with respect to a transverse plane of flange 2), ramp 16 preferably, but not necessarily, is less inclined (namely, less steep) and accordingly longer, than ramp 17. Incidentally, given that there are three teeth 15 by way of example, they are rotated with respect to one another by 120° with respect to the longitudinal axis of flange 2. The teeth 15 preferably lie at the same distance from said axis and, as is shown later in the present description, play a fundamental role in locking the bayonet connection between container 3 and flange 2. Incidentally, although three teeth 15 are shown by way of example, it is sufficient for the flange to comprise one tooth 15 to allow the locking of the bayonet connection between container 3 and flange 2. FIG. 4 shows a front and slightly top perspective view of container 3. With reference to this drawing, it may be noted that container 3—again of the invention—comprises a substantially cylindrical side wall 20, closed by a base 21 at a first end, and delimiting an opening 22 at a second end of wall 20, opposite to said first end. As shown in FIG. 1, when cartridge 1 is completely assembled, flange 2 is inserted in container 3 (which is partially fitted thereon) to reversibly occlude opening 22. Namely, flange 2 is inserted in container 3 coaxially to the latter, with base 8 substantially parallel to base 21 and shank 7 directed towards the latter (namely, inside container 3).

Wall 20 of container 3 comprises a first group of recesses 25 which longitudinally extend in said wall, from opening 22. The recesses 25 (three shown by way of example and corresponding to the aforementioned "first recess") preferably are circumferentially equally spaced from one another and equal to one another. More preferably, the recesses 25 have an almost arched rectangular shape and give the circular edge (of said wall 20) which delimits opening 22, a square wave orientation. Incidentally, given that there are three recesses 25 by way of example, they are rotated with respect to one another by 120° with respect to a longitudinal axis of wall 20 (coinciding with the longitudinal axis of flange 2). As is illustrated later in the present description, the recesses 25, together with the protrusions 10, play a fundamental role in obtaining the bayonet connection between container 3 and flange 2. To this end, the number of recesses 25 equals the number of protrusions 10 and they have a sufficient circumferential extension so that the protrusions 10 may be accommodated respectively in the recesses 25 when flange 2 is partially inserted in container 3 to occlude opening 22. Preferably, the recesses 25 have a circumferential extension which is substantially equal to that of the protrusions 10, and they have such a height in longitudinal direction that when flange 2 occludes opening 22, the protrusions 10 may be positioned respectively abutting against a lower edge 26 of the recesses 25.

Incidentally, although three recesses 25 are shown by way of example, just as it is sufficient for the flange to comprise one protrusion 10 to allow a reversible bayonet connection between container 3 and flange 2, it is similarly sufficient for container 3 to comprise one recess 25 to allow said connection.

Wall 20 of container 3 also comprises a second group of recesses 27 which circumferentially and internally extend in said wall close to opening 22, from the recesses 25, respectively. Namely, the number of recesses 27 (three shown by way of example and corresponding to the aforementioned "second recess") equals the recesses 25 and they extend in wall 20 at the three waves of the above-mentioned square wave, respectively. Preferably, each recess 27 extends from edge 26 of one recess 25, and has a circumferential extension equal to that of the wave crossed so as to lead into the successive recess 25. In light of what is said, the recesses 27 preferably are elongated in shape, circumferentially equally spaced from one another and equal to one another. More preferably, the recesses 27 have an almost constant depth in radial direction and are shaped like grooves. The height of each recess 27 in longitudinal direction is also almost constant. Incidentally, given that there are three recesses 27 by way of example, they are rotated with respect to one another by 120° with respect to the longitudinal axis of wall 20. The recesses 27 preferably lie on the same circumference and as is shown later in the present description, like the protrusions 10 and the recesses 25, they play a fundamental role in obtaining the bayonet connection between container 3 and flange 2. To this end, the recesses 27 and the protrusions 10 substantially have the same height in longitudinal direction so that when accommodated respectively in the recesses 25, the protrusions 10 may be at least partially accommodated in the recesses 27 by means of a relative rotation between flange 2 and container 3 about the longitudinal axis thereof, and so that an at least partial housing of the protrusions 10 in the recesses 27 translationally restrains flange 2 and container 3 to each other.

Incidentally, just like what was said for the recesses 25, although three recesses 27 are shown by way of example, just as it is sufficient for the flange to comprise one protrusion 10 to allow a reversible bayonet connection between container 3 and flange 2, it is similarly sufficient for container 3 to comprise one recess 27 to allow said connection.

To avoid any misunderstanding, the term "recess" in the present description in general means a notch. By way of example, it may correspond to a lowering, like the recesses 25, or to a groove, like the recesses 27. In particular, for the purposes of the invention, rather than being "through" recesses (so as to give the circular edge of wall 20 which delimits opening 22 a square wave orientation), the recesses 25 could equivalently be rectangular non-through notches made in wall 20. In other words, it is worth noting that the recesses 25 extend longitudinally and at least in wall 20 from opening 22, and they are arranged and shaped so that the protrusions 10 may be accommodated respectively therein when flange 2 is partially inserted in container 3 to occlude opening 22. Similarly, the recesses 27 could equivalently be through notches rather than being "non-through" recesses (so as to appear as grooves).

Incidentally in this case, the circumferential extension of the recesses 27 obviously is less than the circumferential extension of the waves of the aforesaid square wave. In other words, it is worth noting that the recesses 27 extend circumferentially and at least in wall 20 from the recesses 25 respectively, and they are arranged and shaped so that the protrusions 10 may be accommodated respectively and at least partially therein when flange 2 is partially inserted in container 3 to occlude opening 22.

Incidentally, an equivalent configuration to that described above is obtained by giving container 3 a substantially cylindrical side wall comprising a plurality of teeth which longitudinally extend from the edge of said wall delimiting the access opening to the container. Said teeth preferably have an arched rectangular shape, are circumferentially equally spaced from one another and equal to one another. The crests of the waves of the aforementioned square wave correspond to said teeth in this equivalent configuration. Namely, the recesses 25 correspond to the spaces between the aforesaid teeth and the recesses 27 correspond to the grooves circumferentially obtained in said teeth. Incidentally, the thickness of wall 20 is not necessarily uniform. In particular, the thickness of wall 20 at the recesses 25 and 27 could be different from the thickness of wall 20 at the remaining portion thereof. In particular, said remaining portion could be characterized by a greater thickness or comprise longitudinal ribs.

Container 3 also comprises multiple grooves 28 which extend longitudinally and in wall 20, from opening 22. There are three grooves 28 in the example (only one of which shown in FIG. 4), they are preferably circumferentially equally spaced from one another and they are equal to one another. More preferably, each groove 28 extends longitudinally in wall 20 with an almost constant radial depth and a circumferential width. Incidentally, given that there are three grooves 28 by way of example, they are rotated with respect to one another by 120° with respect to the longitudinal axis of wall 20. As is illustrated later in the present description, the grooves 28 contribute to locking the bayonet connection between container 3 and flange 2. Incidentally, although three grooves 28 are shown by way of example, it is sufficient for container 3 to comprise one groove 28 to allow the aforesaid locking.

Container 3 also comprises an annular seat 29 made internally on wall 20 close to opening 22, below the grooves 27 (with reference to the orientation of container 3 in FIG. 4). Seat 29 preferably is concentric to opening 22 and accommodates therein a seal 30 (shown in FIG. 7) which ensures a sealing coupling between flange 2 and container 3. Seal 30 preferably is an O-ring and is radially compressed when flange 2 and container 3 are connected to each other (in particular, with container 3 at least partially fitted on flange 2), as shown in FIG. 1. Seal 30 was identified above with the term "first sealing means".

Figure 5:
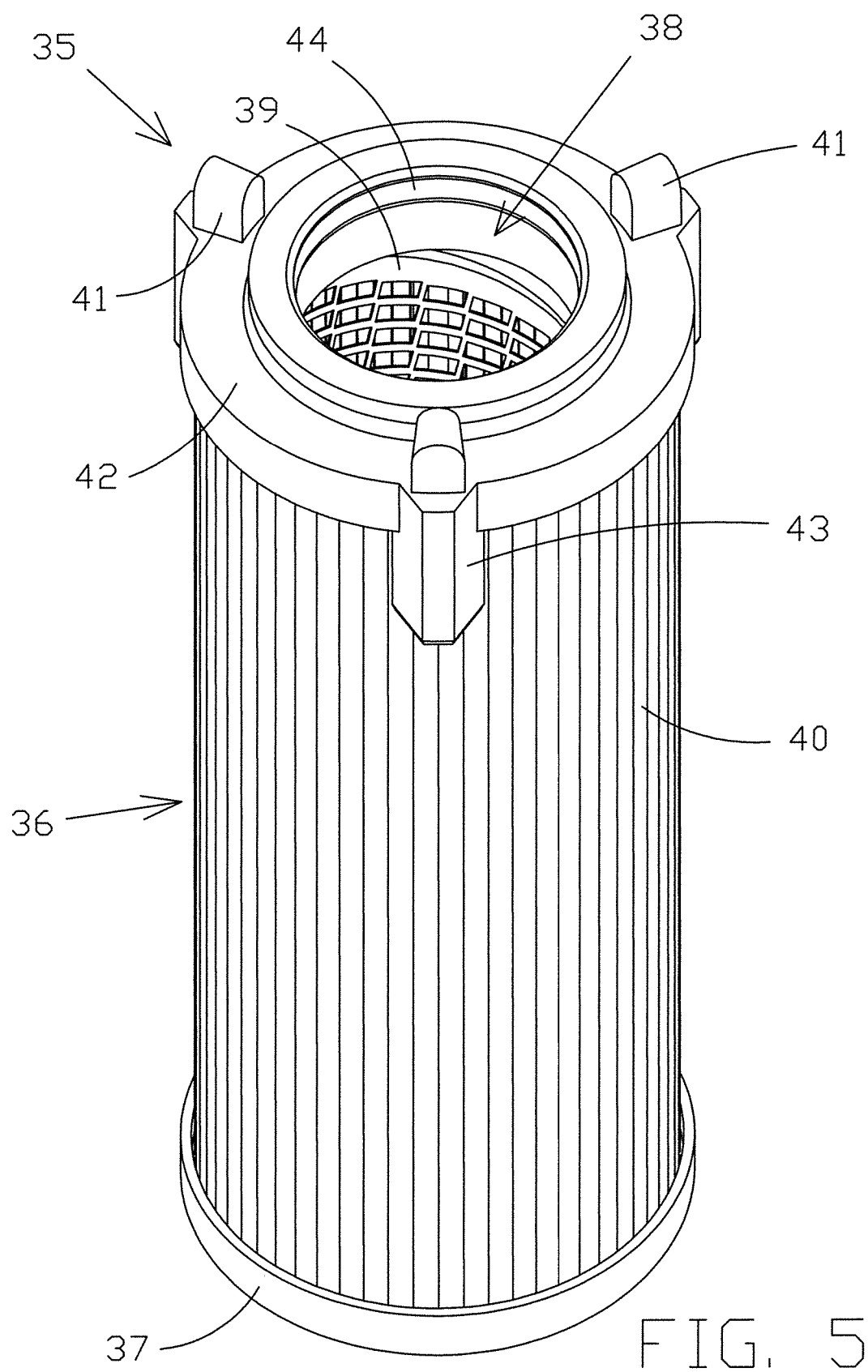
FIG. 5 shows a front perspective view of a third component of the cartridge in FIG. 1. Namely, said third component is a filter unit which may be accommodated in the container in FIG. 4.

FIG. 5 shows a filter unit 35 reversibly accommodated in container 3 (and thus not shown in FIG. 1). Unit 35—again of the invention—comprises a substantially cylindrical side wall 36, closed by a base 37 at a first end, and delimiting an opening 38 at a second end of wall 36, opposite to said first end. Unit 35 is arranged (inside cartridge 1) so that the walls 20 and 36 are coaxial to each other and to flange 2, the bases 21 and 37 are opposed to each other, and opening 38 is opposed to flange 2. Namely, the shank 7 of flange 2 at least partially penetrates unit 35 through opening 38. In other words, unit 35 is partially and reversibly fitted on shank 7 at opening 38 (therefore where unit 35 is connected to flange 2).

Wall 36 comprises a tubular core 39 preferably made of plastic material, including a plurality of through holes and externally coated by a preferably pleated cylindrical element 40 obtained by folding a composite filter septum having a single layer or multi layers, on itself, preferably including cellulose fibers, inorganic microfibers and/or plastic or metal meshes. Element 40 is supported by core 39 and is the filter component "in the strict sense" of cartridge 1. Core 39 and element 40 substantially are known. Therefore, further details will not be provided.

Multiple teeth 41 (three shown by way of example) longitudinally project outwardly (upwards in FIG. 5) from wall 36, preferably from a circular edge 42 of the latter delimiting opening 38. The teeth 41 (corresponding to the aforementioned "first tooth" and equal in number to the teeth 15) preferably are identical to one another and circumferentially equally spaced from one another. Incidentally, given that there are three teeth 41 by way of example, they are rotated with respect to one another by 120° with respect to the longitudinal axis of wall 36 (coinciding with the longitudinal axis of flange 2 and of wall 20 of container 3). The teeth 41 preferably lie at the same distance from said axis and, as is shown later in the present description, in conjunction with the teeth 15 of flange 2, play a fundamental role in locking the bayonet connection between container 3 and flange 2. To this end, with reference to the completely assembled cartridge 1 (namely, as shown in FIG. 1), the teeth 15 and 41 are positioned so as to be in contact with one another when the protrusions 10 are at least partially accommodated in the recesses 27 in a given position indicated above with the term "closed position", so as to oppose the protrusions 10 from moving away from said position in a direction leaving the recesses 27. As is shown in greater detail later in the present description, the teeth 15 and 41 also are shaped so that when they are in contact with each other, a relative rotation between flange 2 and container 3 about the longitudinal axis thereof tends to cause unit 35 and container 3 to translate one with respect to the other. Incidentally, just like what was said for the teeth 15, although three teeth 41 are shown by way of example, just as it is sufficient for the flange to comprise one tooth 15 to allow the locking of the bayonet connection between container 3 and flange 2, it is similarly sufficient for unit 35 to comprise one tooth 41 to allow said locking.

Figure 6:
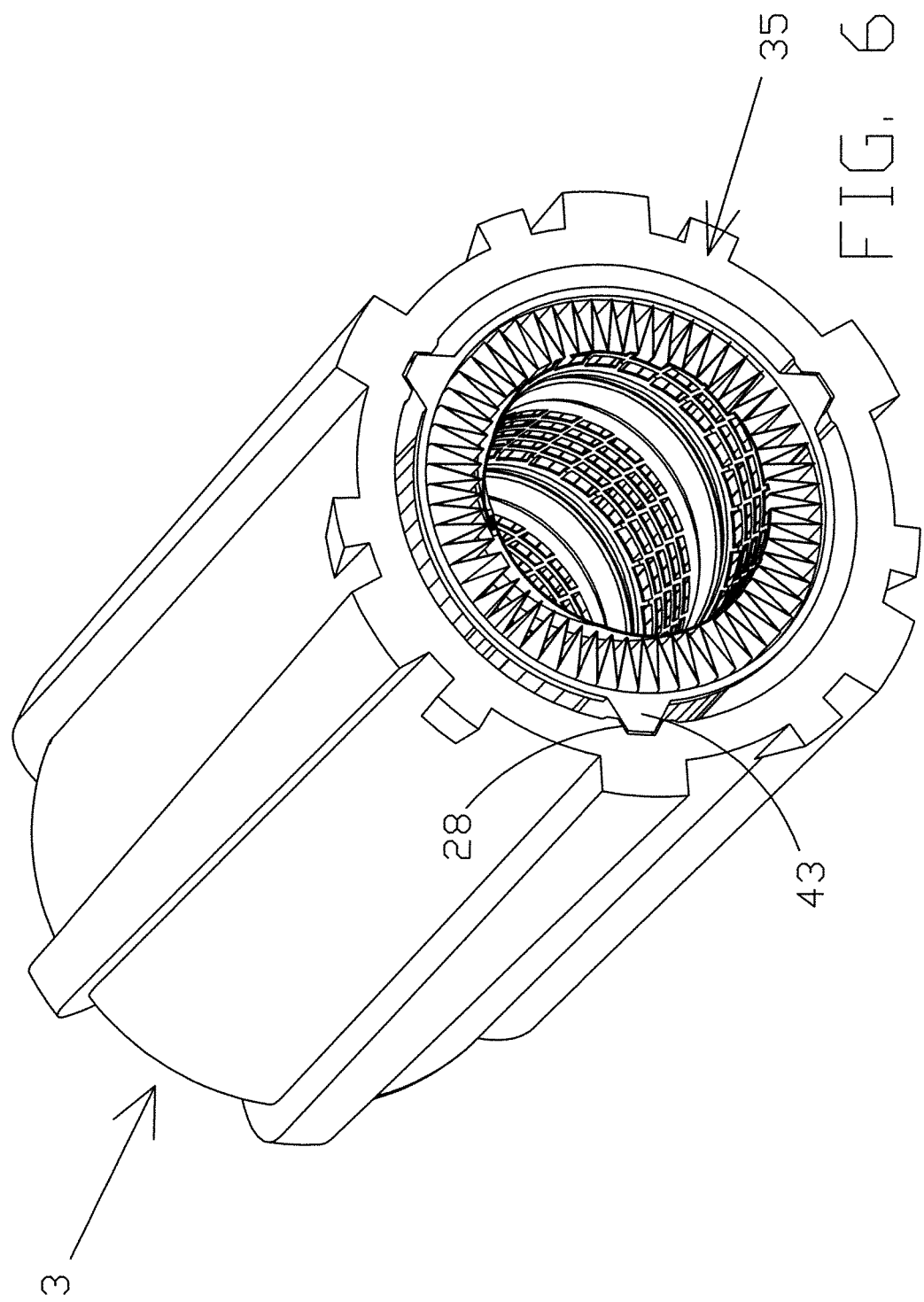
FIG. 6 shows a top perspective and partial cross section view of the filter unit in FIG. 5, accommodated in the container in FIG. 4.

Further teeth 43 (three shown by way of example) radially project outwardly from wall 36, preferably from edge 42 of the latter (namely, close to opening 38). The teeth 43 (corresponding to the aforementioned "third tooth" and equal in number to the grooves 28) preferably are identical to one another and circumferentially equally spaced from one another. Incidentally, given that there are three teeth 43 by way of example, they are rotated with respect to one another by 120° with respect to the longitudinal axis of wall 36. As is illustrated later in the present description, the teeth 43, in conjunction with the grooves 38 of wall 20, play a fundamental role in locking the bayonet connection between container 3 and flange 2. To this end, with reference to the completely assembled cartridge 1, the teeth 43 and the grooves 28 face one another. Namely, as shown in FIG. 6, the teeth 43 are respectively and at least partially accommodated in the grooves 28 and are sliding along them. In light of what is said, the grooves 28 act as sliding seat of the teeth 43 and, in conjunction with the latter, as guiding means of unit 35 with respect to container 3. In particular, the grooves 28 and the teeth 43 are suitable for allowing a translation between unit 35 and container 3 in longitudinal direction and at the same time, for creating a rotational restraint between the latter about the longitudinal axis thereof. Incidentally, just like what was said for the grooves 28, although three teeth 43 are shown by way of example, just as it is sufficient for the container to comprise one groove 28 to allow the locking of the bayonet connection between flange 2 and container 3, it is similarly sufficient for unit 35 to comprise one tooth 43 to allow said locking.

Unit 35 comprises an annular seat 44 made internally on wall 36 at edge 42. Seat 44 preferably is concentric to opening 38 and accommodates therein a seal 45 (shown in FIG. 7) which ensures a sealing coupling between flange 2 and edge 42 of unit 35. Seal 45 preferably is an O-ring and is radially compressed when unit 35 is partially fitted on shank 7 of flange 2. Seal 45 was identified above with the term "second sealing means".

Due to the presence of seal 45, unit 35 divides the space inside container 3 into two compartments: a first compartment, outside unit 35, which is accessible by means of the holes 6, and a second compartment, inside unit 35, which is accessible by means of hole 5 and of opening 38. Namely, the passage of a fluid between the aforesaid first and second compartments may take place only with a crossing of core 39 and of element 40 of unit 35 due to the presence of seal 45.

Figure 7:
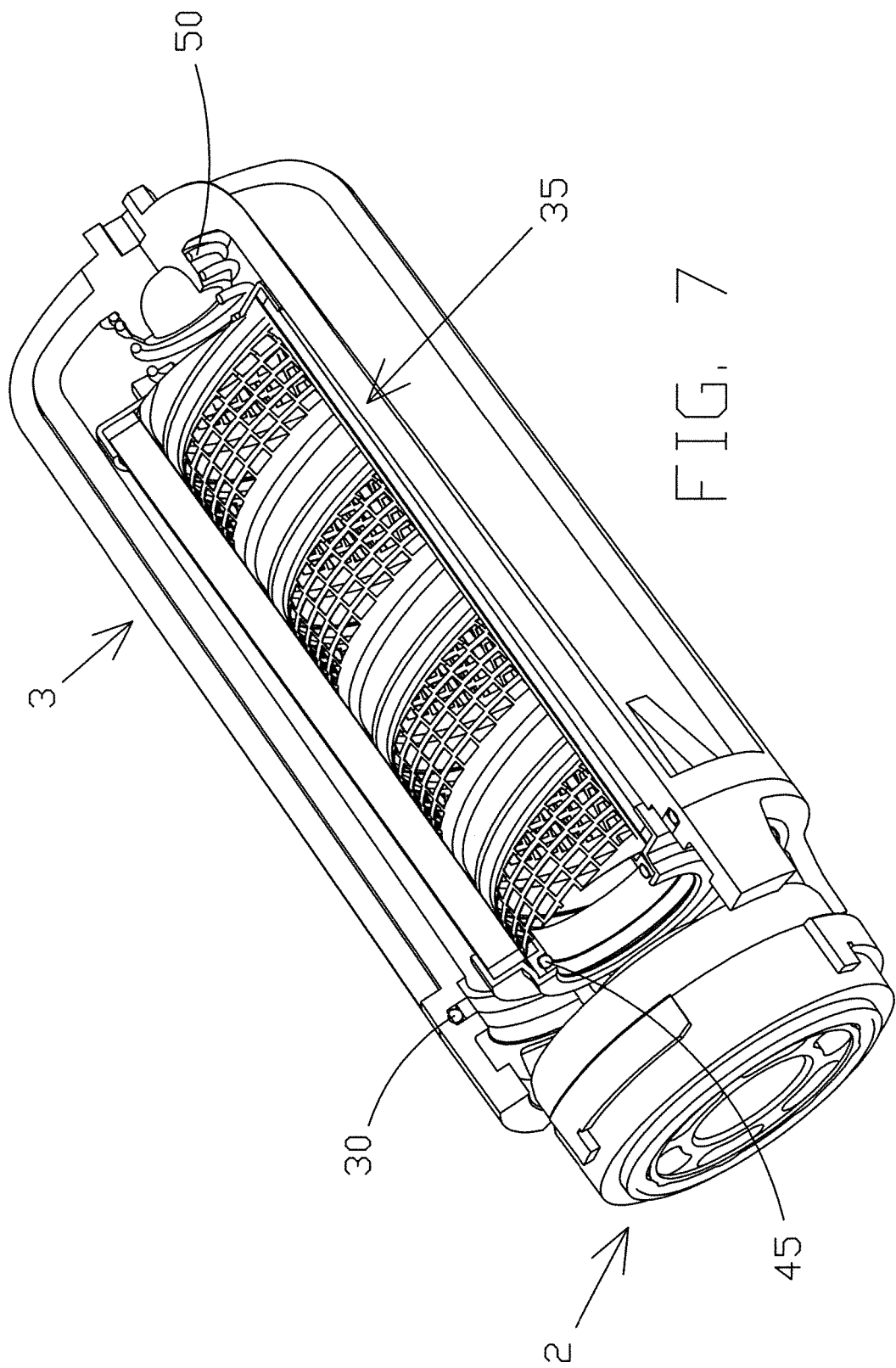
FIG. 7 shows a front exploded perspective and partial cross section view of the cartridge in FIG. 1.
Figure 8:
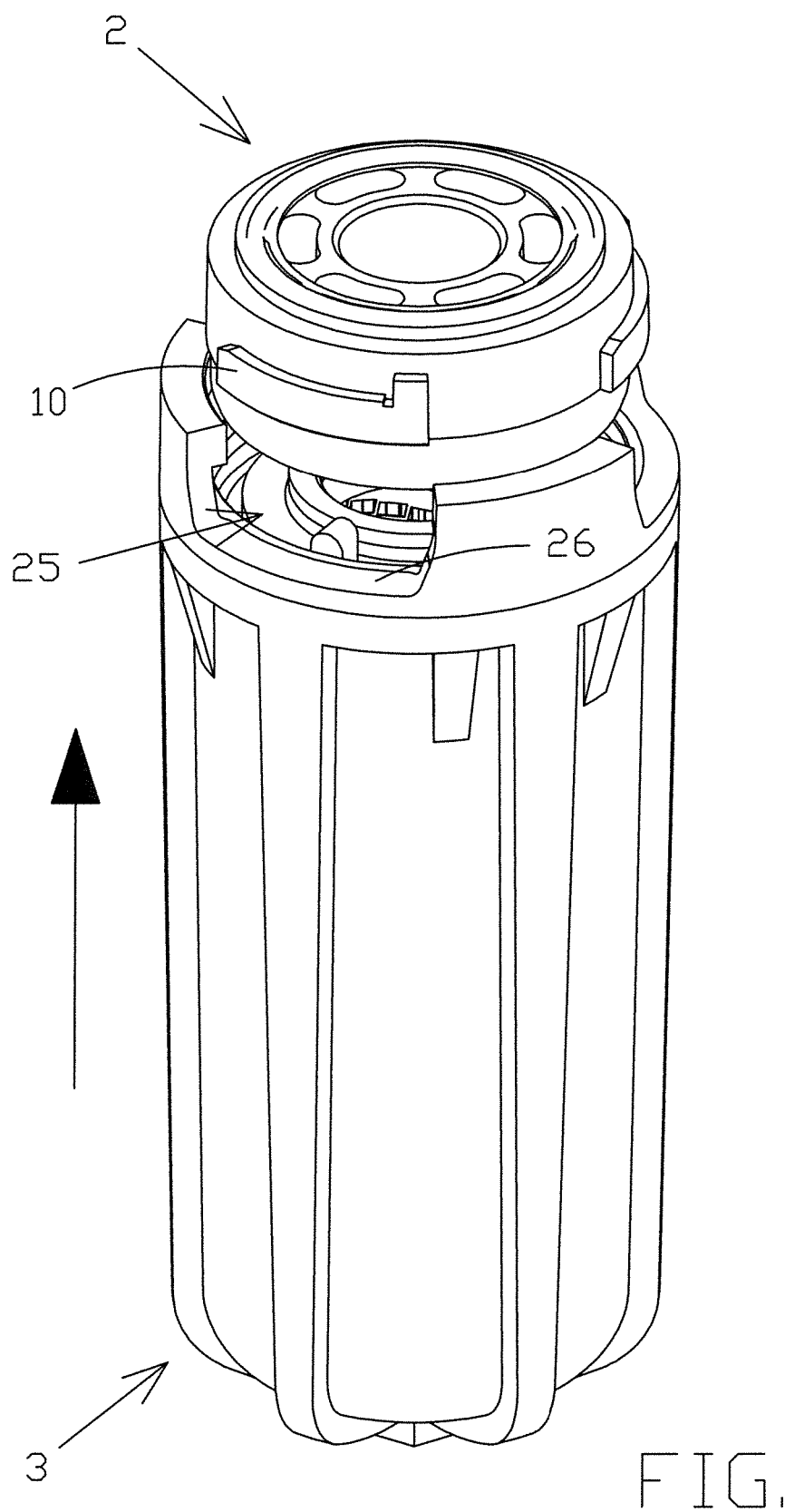
FIGS. 8 and 9 show two respective steps of an assembly procedure of the cartridge in FIG. 1.

With reference to FIG. 7, it may be noted that cartridge 1 also comprises a spring 50 accommodated in container 3 and longitudinally compressed between the bases 21 and 37. Spring 50 thus acts as elastic means adapted to push unit 35 towards shank 7 of flange 2 (with a radial compression of seal 45), thus exerting a longitudinally directed force.

It is now worth noting the structure of cartridge 1 as a whole; an assembly procedure thereof is shown below.

To assemble cartridge 1 from a configuration in which flange 2, container 3 and unit 35 are separate from one another, firstly there is a need to coaxially insert unit 35 into container 3 so as to cause the teeth 43 to slide in the grooves 28. Unit 35 penetrates container 3 up to base 37 coming into contact with spring 50, which is accommodated in container 3 and is connected to base 21 thereof. At the end of this operation, the configuration shown in FIG. 6 is obtained, in which container 3 and unit 35 are rotationally integral with each other.

The successive step in assembling cartridge 1 consists in inserting flange 2 into container 3 at opening 22 so as to occlude the latter. Namely, to fit container 3 on flange 2, said components are to be slid one over the other so that the protrusions 10 penetrate the recesses 25 respectively, up to abutting against the lower edge 26 of the latter. During this operation (at the end of which the configuration shown in FIG. 9 is obtained):

seal 30 is radially tightened between container 3 and flange 2 and unit 35 is partially fitted on shank 7 of flange 2 at opening 38, thus radially tightening seal 45 and without occluding the holes 6.

Flange 2 is sealingly coupled both to container 3 and to unit 35 so as to create the aforesaid first and second compartments, due to the aforesaid radial tightening.

Figure 9:
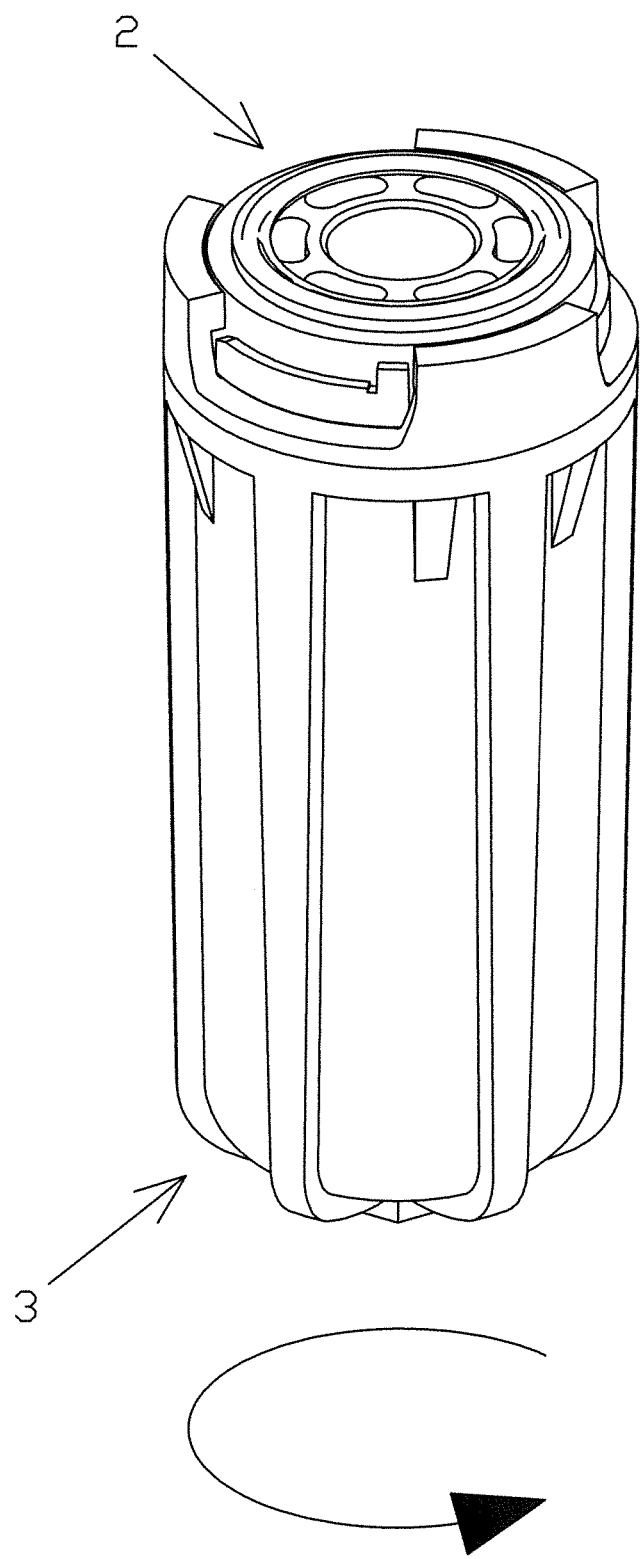

Starting from the configuration shown in FIG. 9, to mutually connect flange 2 and container 3, the latter is caused to rotate clockwise with respect to flange 2, about the longitudinal axis thereof (namely, in the same direction in which container 3 would be screwed on flange 2 if there were a right-handed threaded coupling between them). The protrusions 10 penetrate the recesses 27 respectively due to said rotation until the crests of the waves of the aforementioned square wave (which delimits wall 20 at the top) abut against the blocks 13 (which overlap the protrusions 10 at the end stretch 12 of the latter). In light of what is said, the blocks 13 act as stops, connected to flange 2, against which wall 20 of container 3 abuts. Incidentally, for the purposes of the invention, an equivalent effect would be obtained if the stops were connected to wall 20 of container 3 rather than to flange 2, and the protrusions 10 were to abut against said stops. The position of the protrusions 10 in the recesses 27 when container 3 abuts against the blocks 13 of flange 2 was indicated above with the term "closed position".

Given that unit 35 is rotationally integral with container 3 by means of the teeth 43 and of the grooves 28 during the rotation of container 3 with respect to flange 2 (at the end of which the configuration shown in FIG. 1 is obtained), the teeth 41 of unit 35 also rotate about the longitudinal axis of container 3 up to abutting respectively against the teeth 15 of flange 2. Namely, the teeth 41 intercept the ramps 16 of the teeth 15. The teeth 41 slide on the ramps 16 due to the rotation of container 3 with respect to flange 2, thus moving unit 35 away from flange 2 and accordingly compressing spring 50. In light of what is said, to cause the protrusions 10 to slide in the recesses 27 in order to reach the closed position, there is a need to apply a sufficiently intense torque to container 3 in order to overcome both the friction between the teeth 41 and 15 and the elastic force exerted by spring 50 (which, by compressing, opposes said rotation). When they reach the crest of the teeth 15, the protrusions 10 have not yet reached the closed position, thus the rotation between container 3 and flange 2 continues, causing the teeth 41 to "pass the top". The latter therefore slide on the ramps 17 until wall 20 of container 3 abuts against the blocks 13. When this (closed) position is reached, the teeth 41 are in contact with ramp 17 of the teeth 15.

Summarizing, during a penetration of the protrusions 10 in the recesses 27, from the recesses 25, the teeth 41 come into contact with the teeth 15 first at the ramps 16, then at the ramps 17. When the protrusions 10 are in the closed position, the teeth 41 are in contact with the teeth 15 at the ramps 17. The teeth 15 are therefore shaped so that when they are in contact with the teeth 41, a relative rotation between flange 2 and container 3 about the longitudinal axis thereof tends to translate unit 35 and container 3 one with respect to the other. Namely, when the teeth 15 and 41 are in contact with one another at ramp 16, when the protrusions 10 approach the closed position during a penetration thereof in the recesses 27 (due to a relative rotation between flange 2 and container 3 in clockwise direction), ramp 16 is inclined so as to cause an approach between the bases 21 and 37, thus compressing spring 50. Similarly, when the teeth 15 and 41 are in contact with one another at ramp 17, when the protrusions 10 move away from the closed position in a direction leaving the recesses 27 (due to a relative rotation between flange 2 and container 3 in counterclockwise direction), ramp 17 is inclined so as to cause an approach between the bases 21 and 37, thus compressing spring 50.

In light of what is said, when the protrusions 10 are in the closed position, the blocks 13 act as rotational restraint in clockwise direction and the teeth 15 and 41 act as rotational restraint in counterclockwise direction. The blocks 13 and the teeth 15 and 41 thus act as stopping means of a rotation of container 3 with respect to flange 2 about a longitudinal axis thereof when the protrusions 10 are in the closed position. Given that the housing of the protrusions 10 in the recesses 27 creates a translational restraint between flange 2 and container 3, container 3 is integrally connected with flange 2 when the protrusions 10 are in the closed position.

The connection shown above between flange 2 and container 3 is of the bayonet type. The shape of the aforesaid stopping means ensures said connection is of the reversible type. Indeed, to disconnect container 3 from flange 2, it is sufficient to rotate one with respect to the other in counterclockwise direction, thus exerting a sufficient torque to overcome both the friction between the teeth 15 and 41 and the elastic force of spring 50. As described above, ramp 16 may have a smaller slope with respect to that of ramp 17. In such a case, the torque to be exerted to disconnect container 3 from flange 2 is greater with respect to the torque to be exerted to connect one to the other. Advantageously, there is less risk for an involuntary disassembly of cartridge 1.

Incidentally, an alternative but equivalent configuration to that described above of the stopping means is that in which rather than or in addition to the teeth 15, the teeth 41 are shaped as wedges, with a pair of ramps converging with each other from edge 42.

When cartridge 1 is completely assembled, shank 7 of flange 2 simply requires screwing to the aforesaid nipple to connect cartridge 1 to a nipple of a fluid-dynamic system. At the end of this operation, seal 4 is tightened between flange 2 and the nipple, thus ensuring a sealing coupling between the two. Incidentally, given that the crests of the waves of the above-mentioned square wave abut against the blocks 13, the latter are those to allow the transmission of a screwing torque from container 3 to flange 2.

To disconnect cartridge 1 of the aforesaid nipple, container 3 is to be rotated counterclockwise with respect to flange 2 (thus causing the protrusions 10 to leave the recesses 27) until the crests of the square wave abut against the blocks 13 (on the opposite side with respect to that against which the crests abut against the blocks during an assembly of cartridge 1, namely while the protrusions 10 penetrate the recesses 27). In light of what is said, the blocks 13 act as stops, connected to flange 2, against which wall 20 of container 3 abuts not only during an assembly of cartridge 1, but also during a disconnection of the latter from a nipple to which it was previously screwed. Incidentally, the blocks 13 allow the transmission of an unscrewing torque from container 3 to flange 2.

Figure 10:
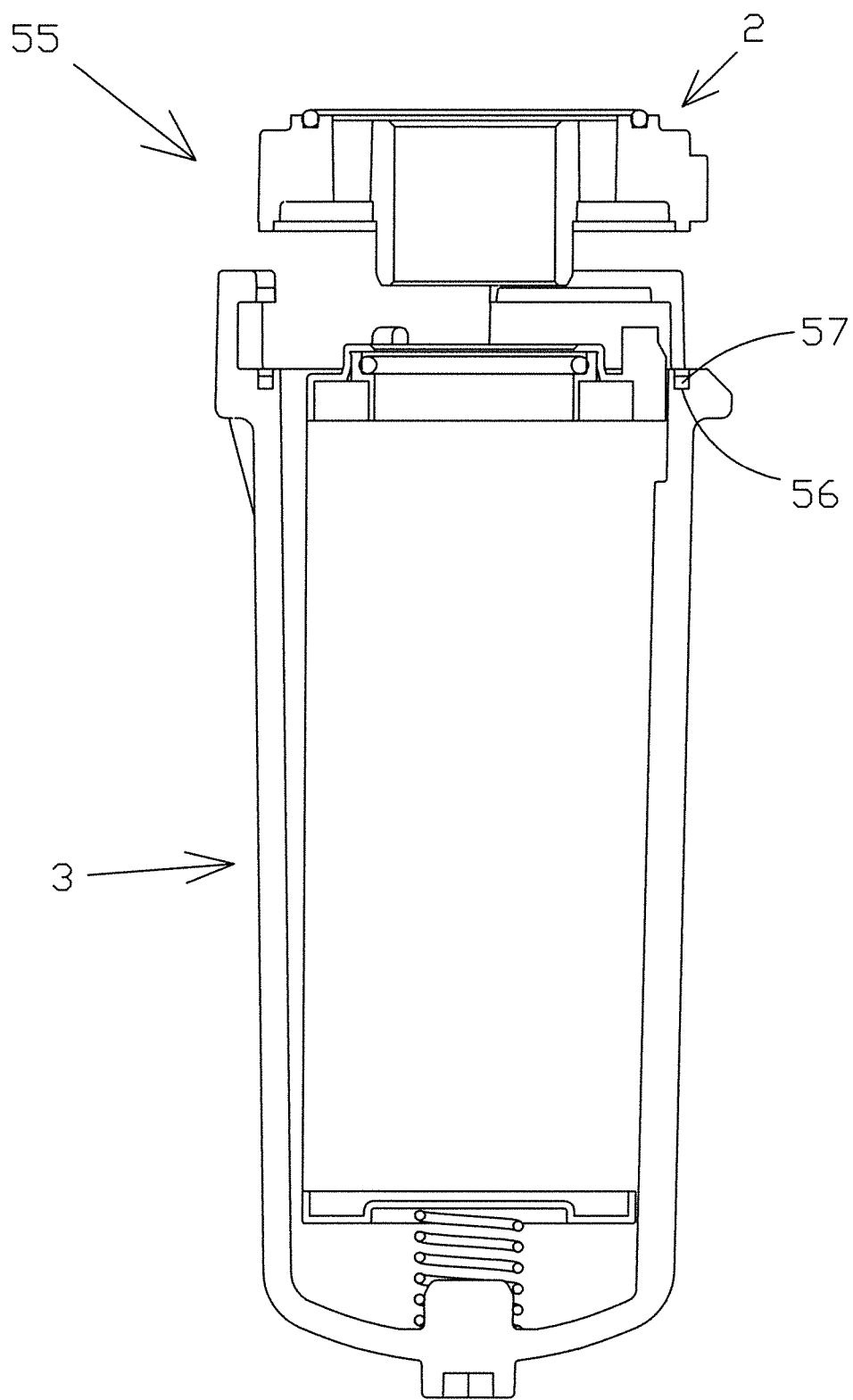
FIG. 10 shows a partially exploded section view of a variant of the cartridge in FIG. 1.

FIG. 10 shows a partial view of a spin-on filter cartridge 55 which differs from cartridge 1 in that in place of seat 29 and of seal 30, it comprises an annular seat 56 made on a step of wall 20 close to opening 22, below grooves 27 (with reference to the orientation of cartridge 55 in FIG. 10), and facing towards flange 2. Seat 56 preferably is concentric to opening 22 and accommodates therein a seal 57 which ensures a sealing coupling between flange 2 and container 3. Seal 57 preferably is an O-ring and is longitudinally (namely, axially) compressed when flange 2 and container 3 are connected to each other (in particular, with container 3 at least partially fitted on flange 2).

On the basis of the description provided for a preferred exemplary embodiment, it is obvious that some changes may be made by those skilled in the art without departing from the scope of the invention as defined by the following claims.

The invention claimed is:
1. A spin-on filter cartridge (1, 55) comprising:
   a discoidal flange (2) at which said cartridge (1, 55) can be reversibly screwed to a fluid-dynamic system,
   said flange (2) comprising:
      at least a first through hole (6) to allow a fluid to be filtered to enter into said cartridge (1, 55);
      at least a second through hole (5) to allow said fluid to exit from said cartridge (1, 55) after being filtered;
   a container (3) comprising:
      at least one cylindrical side wall (20);
      a first base (21) connected to said side wall (20) at a first end thereof;
      an opening (22) at a second end of said side wall (20), opposite to said first end, said opening (22) being reversibly occluded by said flange (2);
   a reversible connection means (10, 13, 15, 25, 27, 41) between said flange (2) and said container (3);
   a first sealing means (30, 57) between said flange (2) and said container (3);
   a filter unit (35) comprising:
      at least one cylindrical side wall (36, 39, 40, 42);
      a second base (37) connected to said side wall (36, 39, 40, 42) of the filter unit (35) at a first end thereof;
      an opening (38) at a second end of said side wall (36, 39, 40, 42), opposite to said first end, said filter unit (35) being reversibly accommodated in said container (3) so that:
      said bases (21, 37) are opposed to each other, and
      said opening (38) of the filter unit (35) is opposed to said flange (2);
   an elastic means (50) accommodated in said container (3) and compressed between said bases (21, 37) so as to push said filter unit (35) towards said flange (2),
   said filter unit (35) dividing the space inside said container (3) into:
      a first compartment, outside said filter unit (35), which is accessible by means of said first through hole (6);
      a second compartment, inside said filter unit (35), which is accessible by means of said second through hole (5) and said opening (38) of the filter unit (35);
   a second sealing means (45) between said flange (2) and said filter unit (35) so that the passage of a fluid between said first and second compartments can only take place with a crossing of said filter unit (35), said reversible connection means (10, 13, 15, 25, 27, 41) comprising:
   at least one protrusion (10) radially projecting from said flange (2);
   at least a first recess (25) extending longitudinally and at least inside said side wall (20) of the container (3), from said opening (22) thereof,
      said first recess (25) having a circumferential extension so that said protrusion (10) can be accommodated in said first recess (25) when said flange (2) occludes said opening (22) of the container (3);
   at least a second recess (27) extending circumferentially and at least inside said side wall (20) of the container (3) close to said opening (22) thereof, from said first recess (25), said protrusion (10) and said second recess (27) having the same longitudinal extension so that:
      when the protrusion is accommodated in said first recess (25), said protrusion (10) may be at least partially accommodated in said second recess (27) by means of a relative rotation
      between said flange (2) and said container (3) about a longitudinal axis thereof, and
      an at least partial housing of said protrusion (10) in said second recess (27) translationally restrains said flange (2) and said container (3) to each other;
   a stopping means (13, 15, 41) adapted to create a reversible rotational restraint about said longitudinal axis between said flange (2) and said container (3) when said protrusion (10) is accommodated in said second recess (27) in a "closed" position,
   so that said reversible connection between said flange (2) and said container (3) is of a bayonet type,
   wherein said elastic means (50) are longitudinally compressed so that said filter unit (35) is pushed towards said flange (2) by a longitudinally directed force,
   said cartridge (1, 55) comprising:
   a guiding means (28, 43) of said filter unit (35) with respect to said container (3), said guiding means (28, 43) being configured for:
      allowing a longitudinal translation and
      creating a rotational restraint about said longitudinal axis between said filter unit (35) and said container (3);
   said stopping means (13, 15, 41) comprising:
   at least one stop (13) integrally connected to said flange (2) or to said container (3), said stop (13) being positioned so that said container (3) or said flange (2) abuts against said stop (13), which is connected to said flange (2) or to said container (3), respectively, when said protrusion (10) reaches said closed position during a penetration thereof in said second recess (27) due to a relative rotation between said flange (2) and said container (3) about said longitudinal axis;
   at least a first tooth (41) projecting longitudinally from said side wall (36, 42) of the filter unit (35) towards said flange (2);
   at least a second tooth (15) projecting longitudinally from said flange (2) towards said filter unit (35),
   said first and second teeth (41, 15) being positioned so as to be in contact with each other when said protrusion (10) is in said closed position so as to counter said protrusion (10) from moving away from said closed position in a direction leaving said second recess (27),
   said first and second teeth (41, 15) being shaped so that when they are in contact with each other, a relative rotation between said flange (2) and said container (3)

about said longitudinal axis tends to cause said filter unit (35) and said container (3) to translate one with respect to the other.

2. The cartridge (1, 55) according to claim 1, wherein said first recess (25) has such a longitudinal extension so that, when said flange (2) occludes said opening (22) of the container (3), said protrusion (10) can be placed abutting against a lower edge (26) of said first recess (25), said second recess (27) extending circumferentially, from said lower edge (26).

3. The cartridge (1, 55) according to claim 1, wherein said first recess (25) has a circumferential extension which is equal to that of said protrusion (10).

4. The cartridge (1, 55) according to claim 1, wherein said guiding means (28, 43) comprise:

at least a third tooth (43) projecting radially and outwards from said side wall (36, 42) of the filter unit (35);

at least one sliding seat (28) of said third tooth (43) extending longitudinally and inside said side wall (20) of the container (3), from said opening (22) thereof.

5. The cartridge (1, 55) according to claim 1, wherein said second tooth (15) comprises a first and a second ramp (16, 17) converging towards each other and at which, respectively:

said first tooth (41) comes into contact with said second tooth (15) during a penetration of said protrusion (10) in said second recess (27), from said first recess (25), and said first tooth (41) is in contact with said second tooth (15) when said protrusion (10) in said closed position, when said first and second teeth (41, 15) are in contact with each other at said first ramp (16), when said protrusion (10) approaches said closed position during a penetration of said protrusion (10) in said second recess (27), said first ramp (16) being inclined so as to cause an approach between said bases (21, 37), thus compressing said elastic means (50), moreover, when said first and second teeth (41, 15) are in contact with each other at said second ramp (17), when said protrusion (10) moves away from said closed position in a direction leaving said second recess (27), said second ramp (17) being inclined so as to cause an approach between said bases (21, 37), thus compressing said elastic means (50).

6. The cartridge (1, 55) according to claim 5, wherein said second ramp (17) is more inclined than said first ramp (16), with reference to a transverse plane (8) of said flange (2).

7. The cartridge (1) according to claim 1, wherein said container (3) is reversibly and at least partially fitted on said flange (2), said first sealing means (30) comprising at least one radially compressed annular seal (30) between said flange (2) and said container (3).

8. The cartridge (55) according to claim 1, wherein said first sealing means (57) comprise at least one longitudinally compressed annular seal (57) between said flange (2) and said container (3).

9. The cartridge (1, 55) according to claim 1, wherein said second through hole (5) is delimited by a tubular shank (7) extending from said flange (2) towards said base (21) of the container (3), said filter unit (35) being reversibly and at least partially fitted on said shank (7) at said opening (38) thereof, said second sealing means (45) comprising at least one radially compressed annular seal (45) between said shank (7) and said filter unit (35).

10. The cartridge (1, 55) according to claim 2, wherein said first recess (25) has a circumferential extension which is equal to that of said protrusion (10).

\* \* \* \* \*